United States Patent
Rieple et al.

(10) Patent No.: US 11,927,257 B2
(45) Date of Patent: Mar. 12, 2024

(54) GEAR FOR USE IN A GEAR TRANSMISSION, GEAR PAIRING OF A GEAR TRANSMISSION AND GEAR TRANSMISSION WITH SUCH A GEAR PAIR

(71) Applicant: IMS Gear SE & Co. KGaA, Donaueschingen (DE)

(72) Inventors: Adrian Rieple, Huefingen (DE); Matthias Koop, Donaueschingen (DE); Sebastian Birk, Trossingen (DE); Stephan Oberle, Villingen-Schwenningen (DE)

(73) Assignee: IMS Gear SE &Co. KGaA, Donaueschingen (DE)

( * ) Notice: Subject to any disclaimer, the term of this patent is extended or adjusted under 35 U.S.C. 154(b) by 664 days.

(21) Appl. No.: 16/774,890

(22) Filed: Jan. 28, 2020

(65) Prior Publication Data
US 2020/0240503 A1 Jul. 30, 2020

(30) Foreign Application Priority Data
Jan. 28, 2019 (EP) .................................... 19154063

(51) Int. Cl.
*F16H 57/12* (2006.01)
*F16H 1/06* (2006.01)
*F16H 55/06* (2006.01)

(52) U.S. Cl.
CPC ............... *F16H 55/06* (2013.01); *F16H 1/06* (2013.01); *F16H 57/12* (2013.01); *F16H 2055/065* (2013.01)

(58) Field of Classification Search
CPC ............... F16H 57/12; F16H 2057/126; F16H 2055/065
See application file for complete search history.

(56) References Cited

U.S. PATENT DOCUMENTS 5,606,890 A * 3/1997 Luckas ..................... F16D 3/68
74/411
6,109,129 A * 8/2000 Genter .................... F16H 55/18
74/397

(Continued)

FOREIGN PATENT DOCUMENTS

DE 102010034261 2/2012
EP 3293420 3/2018

(Continued)

OTHER PUBLICATIONS

Korean Intellecual Property Office, "Notification of Reason of Refusal", issued in Korean Patent Application No. 10-2020-0009798, document of 13 pages, dated Jul. 19, 2021.

(Continued)

*Primary Examiner* — Bobby Rushing, Jr.
(74) *Attorney, Agent, or Firm* — Akerman LLP; Peter A. Chiabotti

(57) ABSTRACT

A toothed gear for use in a gearing, comprising a base body that forms a ring gear with a number of first teeth having a first deformability and a number of second teeth having a second deformability, wherein the second deformability is greater than the first deformability and to a gear pair of a gearing, comprising such a toothed gear and at least one further toothed gear which can be made to mesh or is in mesh with the toothed gear. The invention relates moreover to a gearing with such a gear pair.

13 Claims, 5 Drawing Sheets

(56) References Cited

U.S. PATENT DOCUMENTS

| | | | | |
|---|---|---|---|---|
| 7,969,825 B2* | 6/2011 | Daout | ............... | G04B 35/00 |
| | | | | 74/411 |
| 8,011,267 B2* | 9/2011 | Scheufele | ............. | F16H 55/16 |
| | | | | 74/440 |
| 8,042,423 B2* | 10/2011 | Bannier | ............. | G04B 35/00 |
| | | | | 74/461 |
| 9,222,569 B2* | 12/2015 | Mittermair | ............. | F16H 55/18 |
| 9,234,572 B2* | 1/2016 | Klinger | ............. | G04B 13/025 |
| 2006/0048596 A1* | 3/2006 | Wiederrecht | .......... | F16H 55/16 |
| | | | | 74/461 |
| 2013/0160589 A1 | 6/2013 | Mittermair et al. | | |
| 2013/0255421 A1* | 10/2013 | Schmidt | ............. | F16H 25/2009 |
| | | | | 29/893.1 |
| 2018/0073619 A1* | 3/2018 | Le Roy | ............. | F16H 55/14 |

FOREIGN PATENT DOCUMENTS

| | | | |
|---|---|---|---|
| GB | 2224805 | | 5/1990 |
| JP | S5884257 | | 5/1983 |
| JP | H0783314 A | * | 3/1995 |
| JP | 2002147543 A | * | 5/2002 |
| JP | 2008151277 | | 7/2008 |

OTHER PUBLICATIONS

European Patent Office, "European Search Report", issued in European Application No. 19154063.2, document of 8 pages, dated Jul. 19, 2019.

* cited by examiner

GEAR FOR USE IN A GEAR TRANSMISSION, GEAR PAIRING OF A GEAR TRANSMISSION AND GEAR TRANSMISSION WITH SUCH A GEAR PAIR

CROSS REFERENCE TO RELATED APPLICATIONS

This application claims priority to European Patent Application No. 19 154 063.2, filed Jan. 28, 2019, which is incorporated by reference in its entirety.

BACKGROUND

The present application relates to a toothed gear for use in a gearing. The application relates furthermore to a gear pair comprising such a toothed gear as well as a gearing with such gear pair.

SUMMARY

Gearings are employed in nearly every power train, especially when rotational speed and torque within the power train are to be adapted to a particular application case. With progressing electrification of the drive train, electric motors are increasingly used as torque sources, for example, in order to move two structural parts relative to one another. However, electric motors run conventionally at a relatively high rotational speed such that in many cases a gearing is employed in order to convert the rotational speed such that the two structural parts can be adjusted with the desired speed. In some cases, multi-stage gearings are utilized if the two structural parts are to be moved especially slowly relative to one another or if, for this purpose, especially high torques are necessary.

Involutes are utilized in many cases as gear tooth profiles. Especially if the two toothed gears meshing with one another have a markedly different thermal coefficient of expansion, the engagement can be better or worse depending on the temperature obtaining at the moment. In the following by better engagement is to be understood a reduced circumferential backlash and by worse engagement is to be understood an increased circumferential backlash. Circumferential backlash denotes the angle through which the output shaft of a gearing can be turned out of position relative to the gearing while the drive shaft is retained.

If one toothed gear is comprised of a synthetic material and the other toothed gear of a metal or if the thermal expansion coefficients of the discrete components of a gearing, for example [of] the axis-center distance-/rolling circle-dependent components such as housing, have a marked difference, at the toothing engagement a considerable difference of the obtaining radial-/circumferential backlash will be present with a temperature change. In this case the gear tooth profile is laid out such that, at the temperatures primarily obtaining during operation, the engagement is as optimal as possible. In some applications, however, the temperatures obtaining during operation can vary strongly such that a very large operating temperature range results. Due to the above cited different thermal expansion coefficients of the two engaging toothed gears, the engagement cannot be optimally maintained over the entire operating temperature range. Consequently, for example at the upper end of the operating temperature range, a sufficiently small circumferential backlash can result while at the lower end an undesirably high circumferential backlash is present.

One embodiment of the present application addresses the problem of specifying a toothed gear with which, utilizing simple and cost-effective means, it is possible to provide a remedy for the above described circumstances and, in particular, keep the circumferential backlash low over a temperature range. Furthermore, one implementation and one development of the present application addresses the problem of proposing a gear pair or a gearing which comprises such a toothed gear.

This problem is resolved with the features and structures disclosed herein.

One embodiment of the application relates to a toothed gear for use in a gearing, comprising:
- a base body that forms a ring gear with
- a number of first teeth having a first deformability and
- a number of second teeth having a second deformability, wherein
  - the second deformability is greater than the first deformability, and
  - the second teeth have an oversize compared to the first teeth.

Due to their increased deformability, the second teeth act like a spring element with a second spring rate which is less than the first spring rate of the first teeth. The second teeth can therefore be equipped with an oversize compared to the first teeth.

At a large operating temperature range, for example at temperatures near the lower end of the operating temperature range, the second teeth ensure a low circumferential backlash, while the first teeth, at temperatures near the upper end of the operating temperature range, keep the circumferential backlash low. Due to the increased deformability of the second teeth, the oversize of the second teeth does not lead to the jamming of the engaged toothed gears. The requisite function-related oversize is adapted corresponding to application and operating circumstances.

According to a further embodiment, the second teeth have an oversize in the circumferential direction compared to the first teeth. The oversize can be expressed in particular in an increased extent of the second teeth in the circumferential direction compared to the first teeth. For example, it can be expressed in an increased tooth thickness at the tooth flanks.

It can be sufficient to provide an oversize only in a circumferential direction. In particular in this case, the oversize can be attained with an asymmetric formation of the second teeth.

If the oversize extends only in the circumferential direction, the tip diameter of the second teeth of the particular toothed gear remains unchanged and corresponds to the tip diameter of the first teeth. The running-in characteristic of the toothed gear when engaging into a further toothed gear is improved. In particular, compared to an oversize in the radial direction, it is prevented that the tip of a second tooth impacts on the base of two adjacent teeth of the further toothed gear. As a consequence of the impact, an increased noise generation results, in particular because the tooth can scarcely avoid [such] in the radial direction upon the impact. If the oversize extends only in the circumferential direction, no impact occurs, rather a sliding loading onto the second tooth is generated, as a consequence of which a bending moment acts onto the second tooth approximately in the circumferential direction. The second tooth can avoid this bending moment due to its markedly higher resiliency in the circumferential direction in comparison to the resiliency in the radial direction and thus leads to a smoother and quieter engagement.

According to a further embodiment, in the region of the first teeth the ring gear is closed without interruption in the circumferential direction. In this embodiment an interruption-free engagement between the first teeth and the further toothed gear is provided. Consequently, an optimal and uniform engagement without interruption between the proposed toothed gear and the further toothed gear is ensured and therewith a quiet running.

In a further developed embodiment the toothed gear can have a longitudinal axis, wherein the first teeth, referred to the longitudinal axis, are disposed offset to the second teeth with the formation of an axial distance. Hereby the fabrication of the proposed toothed gear is simplified, in particular since a forming tool, for example a slide, can be introduced between the first teeth and the second teeth. In addition, the [axial distance] spacing provides a space into which the second teeth can be deformed. Due to the capability of deformation of the second teeth into this space, the oversize leads to no substantial impairment of the engagement of the proposed toothed gear with the further toothed gear.

In a further developed embodiment the first teeth can have a first width and the second teeth a second width, wherein the first width is greater than the second width. The second width can be selected such that the deformability of the second teeth is increased along the direction of the rotational axis. The oversize of the second teeth can in this embodiment be shifted in the circumferential direction as well as also in the direction of the rotational axis, thus axially, through deformation and in particular through bending, such that the engagement between the proposed toothed gear and the further toothed gear is not interfered.

According to a further embodiment the base body forms a hub section, wherein the second teeth comprise connection webs that connect the second webs [sic: teeth] with the hub section. Herein on one or all of the connection webs a single second tooth or several second teeth can be disposed. The connection webs act herein like a bending bar clamped on one side and therefore like a spring element. In all embodiments in which the second teeth are disposed on the connection webs, the second deformability is to extend also to the connection webs or be restricted to the connection webs. By means of the cross section and the moment of resistance connected herewith as well as with the length of the connection webs, the second deformability of the second teeth and of the connection webs can be set. It is likewise feasible to equip only the connection webs with the second deformability and to configure the second teeth as such like the first teeth.

In a further embodiment the second width is changed in the radial direction referred to the longitudinal axis. A further developed embodiment is distinguished thereby that on the connection webs a number of fins is disposed. In both embodiments the bending rigidity, in particular of the connection webs, can be changed in the radial direction such that the second deformability can be set highly specifically and purposefully.

In a further embodiment the second teeth can be disposed in a circular sector-shaped region of the toothed gear. In some applications the increased circumferential backlash is only of importance during the start-up from the resting position. As soon as the engaged toothed gears rotate, the non-optimal engagement in these applications can be accepted in particular at the lower end of the operating temperature range. In the case the resting position is associated with a specific rotation position of the proposed toothed gear, it suffices to dispose the second toothed gears [sic: teeth] in a circular sector-shaped region. Outside of the circular sector-shaped region exclusively the first teeth are in engagement such that here the second teeth cannot exert an interfering effect on the engagement.

A further developed embodiment is distinguished thereby that the first width of the first teeth is less in the circular sector-shaped region than outside of the circular sector-shaped region. In the circular sector-shaped region the ring gear comprises within the first teeth an offset in which the second teeth can be partially or entirely disposed. To this extent, the axial installation volume required for the first and the second teeth can be kept low such that the proposed toothed gear can be provided with a low extent along the longitudinal axis.

According to a further embodiment the second teeth are disposed on a common carrier. In all embodiments in which the second teeth are disposed on the common carrier, the second deformability is to extend to the common carrier also. The common carrier can also be fabricated as a separate structural part and be subsequently connected with the proposed toothed gear. This allows the fabrication to be simplified. In addition, the [common] carrier and the second teeth can in this case be fabricated of a different material than the remaining toothed gear such that the second deformability of the second teeth can be set as desired via the material also.

A further embodiment is distinguished thereby that the ring gear is free of interruptions in the region of the second teeth within the common carrier in the circumferential direction. This embodiment lends itself when the second deformability is not intended to be too large. The fabrication of the second [sic: common] carrier is simple in this embodiment (Winkelbereich): (angle range): [sic]

According to a further embodiment the carrier comprises along the longitudinal axis a cutout or a cavity. Due to this cutout or cavity the mass of the carrier can be kept low without the settability of the second deformability being significantly impaired.

In a further developed embodiment the carrier can comprise a cut starting from the cutout or from the cavity extending radially outwardly or a slit extending from the cavity and extending radially outwardly. Due to the slit or the cut, the carrier is specifically and intentionally weakened whereby the second deformability can be increased.

In a further developed embodiment the carrier can comprise in the direction of the longitudinal axis an axial spacing and/or in the circumferential direction a circumferential spacing from the first teeth. In both cases the movability of the carrier with respect to the first teeth is enabled and specifically in the direction of the longitudinal axis and/or in the circumferential direction. The direction of the second deformability can hereby be specified.

In a further embodiment the second teeth can have a gear tooth profile with a tooth tip modification. With the modification of the tooth tip the run-in behavior of the second teeth into the toothing of the further toothed gear can be specifically changed. A tooth tip modification, on the one hand, is not absolutely required for increasing the deformability and, on the other hand, does not necessarily lead to an oversize. However, the tooth tip modification can be shaped such that an oversize of the second teeth relative to the first teeth is provided. In particular, apart from the improved run-in behavior, the circumferential backlash can simultaneously be reduced. If appropriate, the first teeth can also be provided with a tooth tip modification whereby the run-in behavior can also be improved.

In a further embodiment the second teeth comprise a groove extending radially outward or a gap extending radially outwardly. The second deformability within the second teeth can hereby be changed.

In particular when an oversize relative to the first teeth is provided, it can be distributed through a corresponding deformation of the second teeth such that jamming is prevented.

A further developed embodiment is distinguished thereby that the toothed gear is comprised of a technical thermoplastic material or a high-performance thermoplastic material. Non-exhaustive examples of such thermoplastic materials are POM (polyoxymethylene), PA (polyamide), PK (polyketone), PPA (polyphthamalide), PEEK (Polyetheretherketone) or PPS (polyphenylsulfide). Furthermore, semi-aromatic polyamides such as PA4T, PA6T or PA9T can be employed. Such thermoplastic materials permit, on the one hand, the production of the proposed toothed gear in an injection molding process such that the proposed toothed gears can be produced cost-effectively in large piece numbers. On the other hand, these thermoplastic materials provide high wear resistance such that the toothed gears have a long service life. However, depending on the application case, it may be useful to employ another synthetic material, for example a duroplastic material, for the fabrication of the proposed toothed gear.

In a further embodiment the toothed gear has a modulus of elasticity of 1000 to 3500 MPa. With this modulus of elasticity the second deformability can be set such that it has the stated effect in particular on the circumferential backlash.

According to a further embodiment the technical thermoplastic or the high-performance thermoplastic is entirely or partially self-reinforcing or fiber-reinforced, wherein the fiber component is up to 35% and in particular is between 5 and 30%. In order to implement the technical thermoplastic or the high-performance thermoplastic to be self-reinforcing, its molecular structure and crystallinity can be specifically and purposefully modified. In particular the tensile strength can hereby be increased without having to add further components. The self-reinforcing synthetic material can furthermore be implemented to be very tough such that it only starts to fracture at temperatures below −35° C. In addition, further components can be added to the self-reinforcing synthetics in order to modify specific properties intentionally. Both measures aim to be able to employ the proposed toothed gear for high loads also.

A further embodiment is distinguished thereby that when the technical thermoplastic or the high-performance thermoplastic is a self-reinforcing or fiber-reinforced thermoplastic, it has a modulus of elasticity between 6000 and 13000 MPa. These moduli E are set in particular outside of the second teeth and outside of the connection webs. Especially the hub section is equipped with such a modulus E in order to be able to introduce high torques into the proposed toothed gear. It is therefore feasible to equip certain regions of the proposed toothed gear specifically and purposefully with other mechanical properties, in particular without having to employ other thermoplastics.

According to a further developed embodiment the first teeth are comprised of a first material, in particular a first technical thermoplastic or a first high-performance thermoplastic, and the second teeth are comprised of a second material, in particular of a second technical thermoplastic or a second high-performance thermoplastic, wherein the second technical thermoplastic or the second high-performance thermoplastic has a lower modulus of elasticity and/or a lower thermal coefficient of expansion than the first technical thermoplastic or the first high-performance thermoplastic. In this embodiment the first teeth and the second teeth are comprised of different materials. In particular if the proposed toothed gear is comprised of two different thermoplastics, for example the second teeth and/or the connection webs can be molded onto the remaining toothed gear. It is also feasible to produce the second teeth and/or the connection webs as separate parts and to connect the second teeth and/or the connection webs with the remaining toothed gear after its fabrication. As stated in the introduction, the circumferential backlash is to be kept low over a broad temperature range. In this embodiment example the second teeth expand less strongly at increasing temperatures than the first teeth. It is therefore feasible to prevent interfering engagements of the second teeth in spite of oversize when the operating temperature range is reached.

Due to the feasibility of employing a second technical thermoplastic or a second high-performance thermoplastic with a lower modulus of elasticity, the second deformability can be increased hereby alone without having to provide particular geometries for the second teeth and/or the connection webs.

According to a further embodiment the toothed gear has a straight-cut toothing or a helical toothing with a helix angle $\beta$ of up to 15°. The proposed toothed gear can consequently be used not only for gearings with a straight-cut toothing but also for spur gearing with helical toothing. Due to their increased overlap ratio, spur gearings with helical toothing are distinguished by a quieter and smoother running behaviour compared to straight-cut toothing.

One implementation of the application relates to a gear pair of a gearing, comprising a toothed gear according to one of the preceding embodiments and at least one further toothed gear which can be brought into engagement with the toothed gear or is in engagement with same. The further toothed gear is herein furthermore fabricated in particular of metal, while the proposed toothed gear is comprised of synthetic material such that the material pairing 'synthetic-metal' results.

One development of the application relates to a gearing comprising a gear pair according to the previously disclosed implementation. The technical effects and advantages that can be achieved with the proposed gear pair as well as with the proposed gearing correspond to those that have been discussed for the present toothed gear. In summary, reference is made to the fact that the circumferential backlash, in particular in large operating temperature ranges, can be kept low at the upper and lower end.

BRIEF DESCRIPTION OF THE DRAWING

Exemplary embodiments of the application will be explained in the following in greater detail with reference to the attached drawing. Therein depict.

DETAILED DESCRIPTION

Figure 1A:
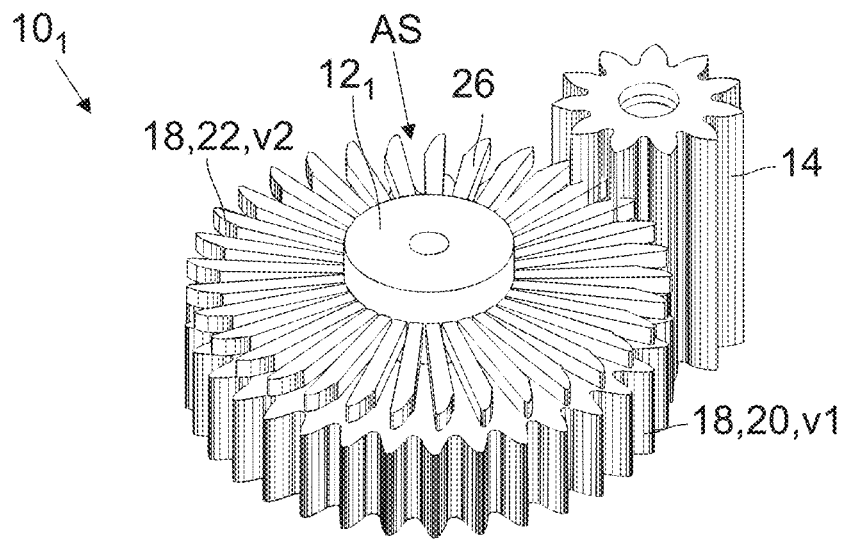
FIG. 1A to 1C a first embodiment example of a gear pair in conjunction with different views, FIG. 2 a second embodiment example of a toothed gear according to the application in conjunction with a fundamental sectional representation, FIG. 3 a third embodiment example of a toothed gear according to the application in conjunction with a fundamental sectional representation, FIGS. 4A and 4B a fourth embodiment example of a gear pair according to the application in conjunction with different views, FIG. 4C an isolated perspective representation of a toothed gear of the gear pair according to the fourth embodiment example, FIG. 5A to 5C a fifth embodiment example of a gear pair according to the application in conjunction with different views, FIG. 5D an isolated representation, not to scale, of a representation of a toothed gear of a gear pair according to the fifth embodiment example, FIG. 6 an isolated top view of a sixth embodiment example of a gear pair according to the application, wherein the proposed toothed gear is only partially shown, FIGS. 7A and 7B a basic representation of tooth profiles, in which the [seventh] proposed gear pair can be applied, FIG. 8A a basic representation of a gearing with a [seventh] proposed gear pair, FIG. 8B an isolated representation, not to scale, of a toothed gear of the gear pair according to the seventh embodiment example.
Figure 1B:
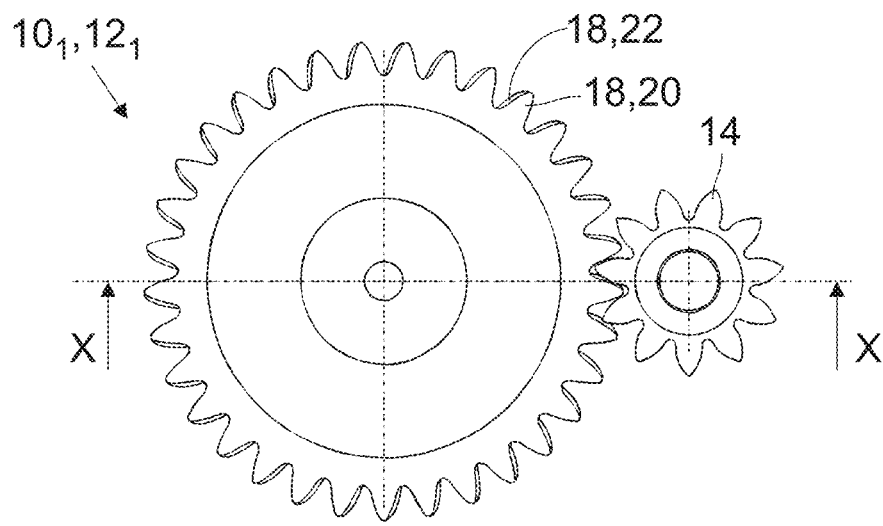
Figure 1C:
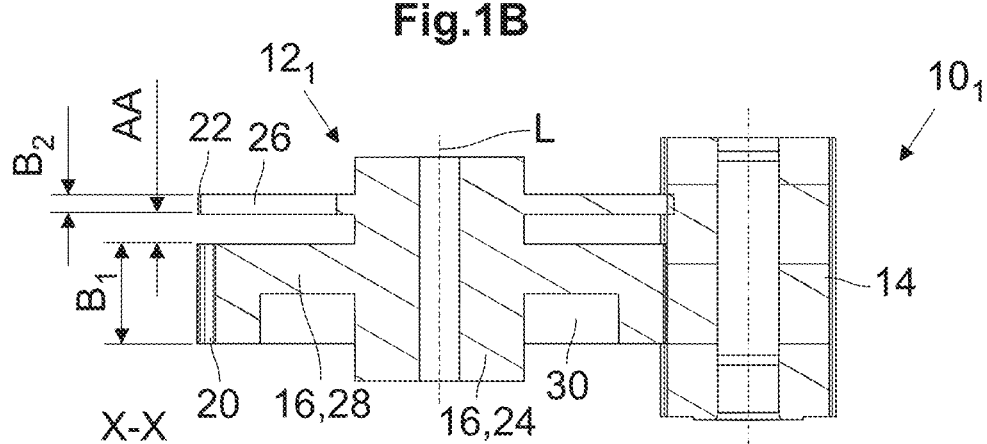

In FIGS. 1A to 1C is depicted a first embodiment example of a gear pair $10_1$ according to the disclosure with reference to several different views. FIG. 1A shows herein a perspective view while FIG. 1B is a bottom view and FIG. 1C is a sectional representation along the section plane X-X defined in FIG. 1B. The gear pair $10_1$ comprises a toothed gear $12_1$ according to a first embodiment example, and a further toothed gear 14, wherein the toothed gear $12_1$ and the further toothed gear 14 are in mesh. In the first embodiment example the toothed gear $12_1$ and the further toothed gear 14 are implemented as spur gears with straight-cut toothing.

The toothed gear $12_1$ comprises a base body 16 (see FIG. 1C) which forms a ring gear 18. The ring gear 18 comprises a number of first teeth 20 and a number of second teeth 22. In the first embodiment example the number of first teeth 20 and that of second teeth 22 is identical, however it can also differ (see FIGS. 4 to 6). The first teeth 20 as well as also the second teeth 22 are disposed uniformly distributed over the entire circumference of the proposed toothed gear $12_1$. In the region of the first teeth 20 the ring gear 18 is circumferentially closed without interruption.

As is especially evident in FIG. 1C, the base body 16 forms a cylindrical hub section 24. The second teeth 22 comprise rod-shaped connection webs 26 with which the second teeth 22 are connected to the hub section 24. The connection webs 26 start from the hub section 24 and extend substantially radially outwardly. In the first embodiment example each second tooth 22 in each instance comprises one connection web 26 such that the number of connection webs 26 is equal to the number of second teeth 22.

The first teeth 20 are connected with the hub section 24 across a disk-shaped connection section 28 formed by the hub section 24, wherein the connection section 28 comprises an annular cavity 30. The annular cavity [30] serves primarily for the technical molding optimization of the toothed gear $12_1$, for example in order to avoid the formation of shrinkage voids during the production of the toothed gear $12_1$ according to the disclosure. In addition, material can be saved in this manner.

The first teeth 20 have a first deformability v1 and the second teeth 22 have a second deformability v2. Due to the geometric shaping and/or the selection of the material parameters of the first teeth 20 and of the second teeth 22, the second deformability v2 is greater than the first deformability v1.

The proposed toothed gear $12_1$ has a longitudinal axis L (cf. FIG. 1C) about which the toothed gear $12_1$ in the operationally ready state is rotatable. Referred to the longitudinal axis L, the second teeth 22 are disposed on the hub section 24 such that they are offset with respect to the first teeth 20 and such that a distance AA is formed in the axial direction between the first teeth 20 and the second teeth 22. The first width B1 is herein greater than the second width B2.

Between two adjacent connection webs 26 there remains a radially outwardly increasing distance AS (see FIG. 1A) such that the ring gear 18 in the region of the second teeth 22 is not closed in the circumferential direction, in contrast to the region of the first teeth 20.

In the first embodiment example the toothed gear $12_1$ is fabricated of a technical thermoplastic or a high-performance thermoplastic. Examples of such thermoplastics are POM (polyoxymethylene), PA (polyimide), PK (polyketone), PPA (polyphthalamide), PEEK (polyetheretherketone) or PPS (polyphenylsulfide). In the entire toothed gear $12_1$ obtains a modulus of elasticity E of 1000 to 3500 MPa. Depending on the utilized thermoplastic and the desired modulus of elasticity E, the thermoplastic can be self-reinforcing or fiber-reinforced. In this case the toothed gear $12_1$ can be regionally equipped with different moduli of elasticity E. For example, the entire toothed gear $12_1$, except for the connection webs 26 and the second teeth 22, can be fabricated with a self-reinforcing or fiber-reinforced thermoplastic such that the connection webs 26 and the second teeth 22 have the increased second deformability v2, while the toothed gear $12_1$ in the remaining region has the decreased first deformability v1.

It is especially evident in FIG. 1B that the second teeth 22 are disposed with respect to the first teeth 20 such that an oversize in the circumferential direction is attained. In the first embodiment example the second teeth 22 are shaped such that, with respect to the representation in FIG. 1B, a one-sided oversize compared to the first teeth 20 in the clockwise direction results, wherein the toothed gear $12_1$ can also be shaped such that the one-sided oversize in the clockwise direction results. Based thereon, it is apparent that the oversize can be provided by the disposition alone of the second teeth 22, with respect to the first teeth 20, alone. A one-sided oversize can suffice to attain the desired effects onto the circumferential backlash. It is therefore not mandatory that the tooth flanks have a bilateral thickening.

Figure 2:
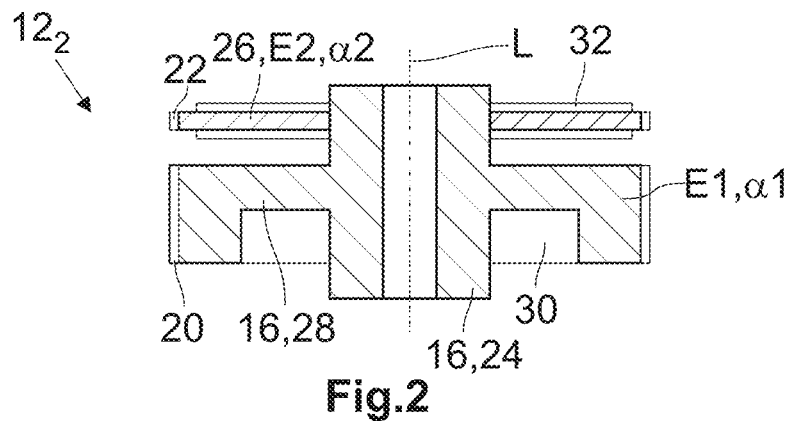

In FIG. 2 is shown a second embodiment example of the toothed gear $12_2$ based on a sectional representation oriented along the section plane X-X of FIG. 1B. The fundamental structure of the toothed gear $12_2$ according to the second embodiment example resembles the structure of toothed gear $12_1$ according to the first embodiment example such that in the following only their differences will be discussed. The hub section 24, the connection section 28 and the first teeth 20 are fabricated of a first technical thermoplastic or a first high-performance thermoplastic, whereas the second teeth 22 and the connection webs 26 are comprised of a second technical thermoplastic or a second high-performance thermoplastic. The first technical thermoplastic or the first high-performance thermoplastic have herein a first modulus of elasticity E1 and the second technical thermoplastic or the second high-performance thermoplastic have a second modulus of elasticity E2, wherein the first modulus of elasticity E1 is higher than the second modulus of elasticity E2.

Alternatively or cumulatively, the first technical thermoplastic or the first high-performance thermoplastic has a first thermal coefficient of expansion α1 and the second technical thermoplastic or the second high-performance thermoplastic has a thermal coefficient of expansion α2, wherein the first thermal coefficient of expansion α1 is higher than the second thermal coefficient of expansion α2.

In addition, on the connection webs 26 a number of fins 32 is disposed which fins, starting at the hub section 24, extend substantially radially outwardly.

Figure 3:
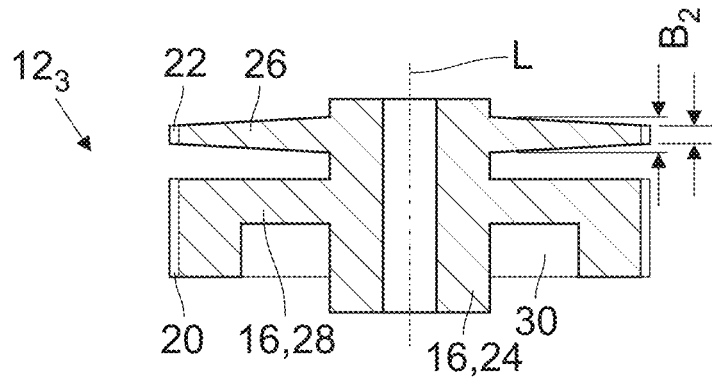

In FIG. 3 a third embodiment example of the toothed gear $12_3$ is shown also based on a sectional representation oriented along the sectional plane X-X of FIG. 1B. In the third embodiment example the second width B2 of the connection web 26 is changed such that, starting from the hub section 24, it decreases radially outwardly.

Figure 4A:
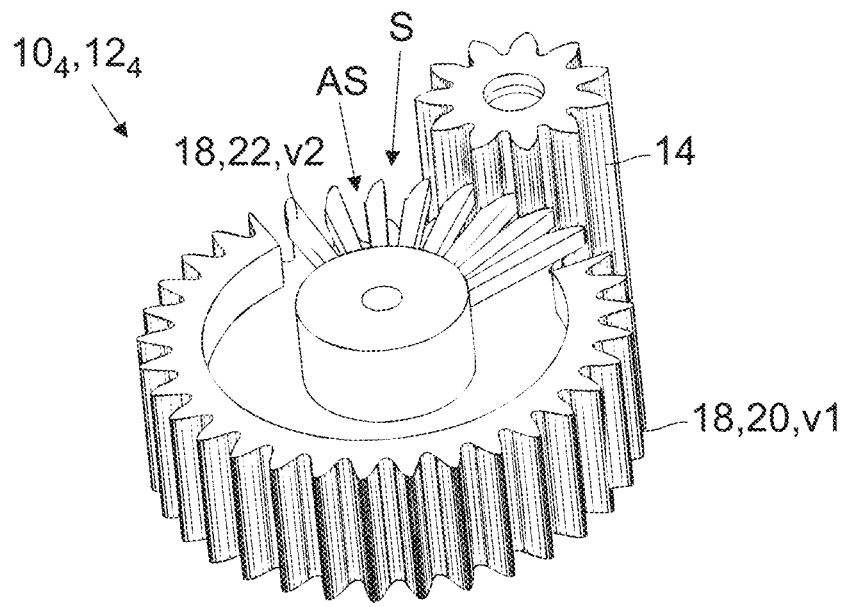
Figure 4B:
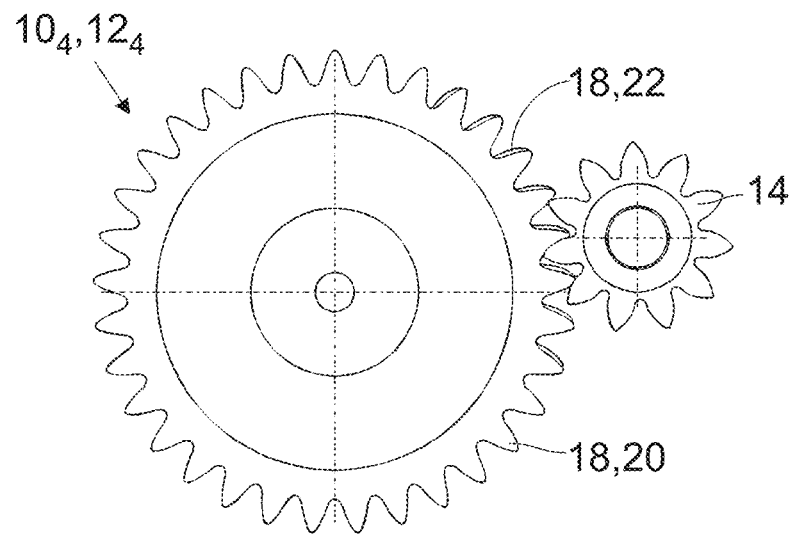
Figure 4C:
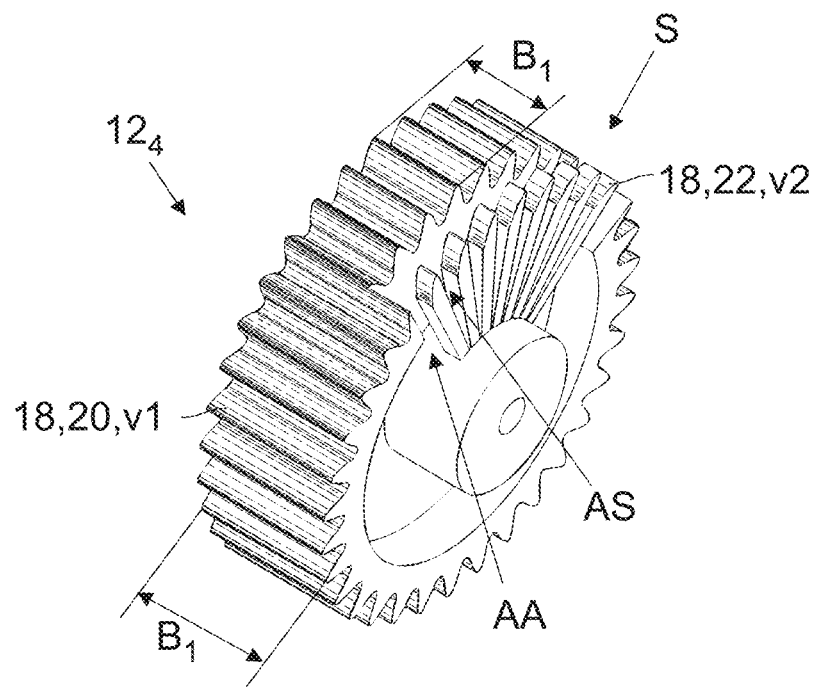

In FIGS. 4A and 4B a fourth embodiment example of the gear pair $10_4$ according to the disclosure is depicted by means of a perspective representation and a bottom view, respectively, which comprises a toothed gear $12_4$ according to a fourth embodiment example. In FIG. 4C the toothed gear $12_4$ shown in isolation based on a perspective representation. In the fourth embodiment example the second teeth 22 are disposed in a circular sector-shaped region S uniformly distributed in the circumferential direction. The ring gear 18 consequently comprises only the second teeth 22 in the circular sector-shaped region S and which teeth are not distributed over the entire circumference.

In FIG. 4B is evident that the second teeth 22 are shaped as they are also in the first embodiment example such that they provide a one-sided oversize compared to the first teeth 20. In reference to the representation in FIG. 4B, the oversize is disposed counterclockwise compared to the first teeth 20. An oversize compared to the first teeth 20 in the clockwise direction is also conceivable.

As is in particular evident in FIG. 4C, the first width B1 of the first teeth 20 within the circular sector-shaped in the region S is less than [such width] outside [of S]. The circular sector-shaped region S is delimited in the circumferential direction by the first teeth 20 which have the greater first width B1. Again, there remains an axial distance AA between the first teeth 20 and the second teeth 22. As was the case in the three previously described embodiment examples, there remains between two adjacent connection webs 26 a radially increasing distance AS such that the ring gear 18 is not closed within the second teeth 22 in the circular sector-shaped region S.

Figure 5A:
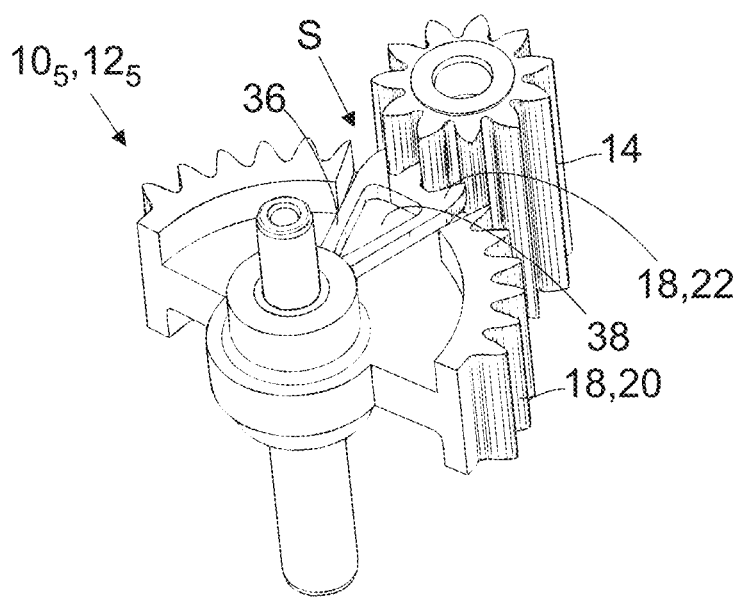
Figure 5B:
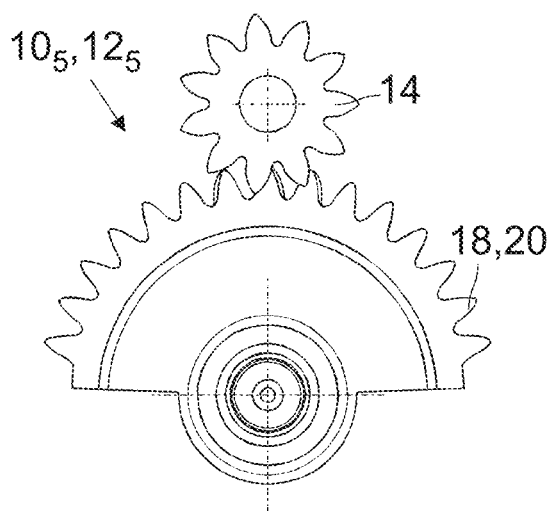
Figure 5C:
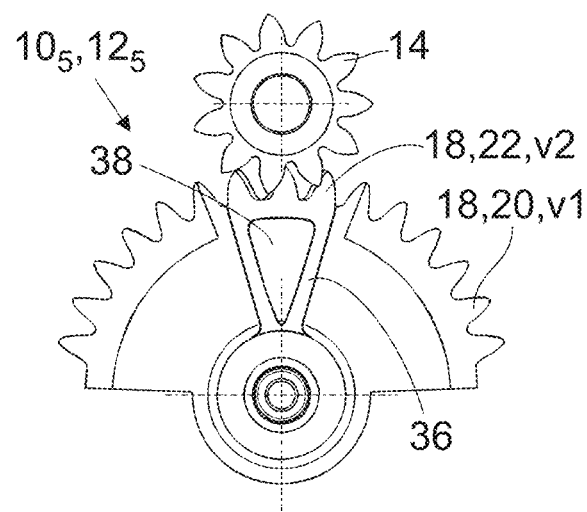
Figure 5D:
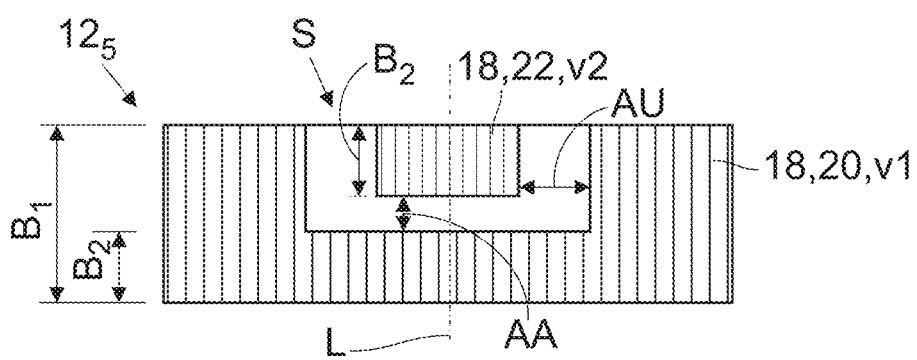

In FIGS. 5A to 5C a fifth embodiment example of the gear pair $10_5$ with a toothed gear $12_5$ according to a fifth embodiment example is shown based on several different representations, wherein FIG. 5A is a perspective view, FIG. 5B a bottom view and FIG. 5C a top view. In FIG. 5D the toothed gear $12_5$ according to the fifth embodiment example is depicted not-to-scale in isolation based on a side view. In the fifth embodiment example the second teeth 22 are disposed on a common carrier 36 that is disposed within a circular sector-shaped region S. The first teeth 20 have in the fifth embodiment example also within the circular sector-shaped region S a lesser first width B1 than outside of S. The circular sector-shaped region S is again delimited in the circumferential direction by the first teeth 20 which have the greater first width B1.

The common carrier 36 comprises a cutout 38 or a cavity, in particular for the purpose of increasing the second deformability v2 and to decrease the formation of shrinkage voids. The common carrier 36 can be developed as a separate structural part and be slid onto the hub section 24. In particular when the common carrier 36 is developed as a separate structural part, it lends itself to fabricate the common carrier 36 of the already cited second technical thermoplastic or the second high-performance thermoplastic. Overall three second teeth 22 are disposed on the common carrier 36 which, however, in contrast to the second teeth 22 of toothed gears 12, mesh without interruption. In principle, it would suffice to provide only one second tooth 22 in order to attain the effect according to the disclosure, which will be discussed in greater detail further down.

In FIGS. 5B and 5C is evident that there is also only a one-sided oversize provided in the fifth embodiment example $10_5$. In reference to FIG. 5B, the second teeth 22 are shaped such that, in reference to the first teeth 20, they provide one oversize in the counterclockwise direction and two oversizes in the clockwise direction. Other combinations of the orientation of the oversize in reference to the clockwise direction are also feasible.

As is evident in FIG. 5D, the second teeth 22 disposed on the common carrier 36 have along the longitudinal axis L an axial distance AA and in the circumferential direction on both sides a circumferential distance AU. However, it is equally feasible to dispose the common carrier 36 in the axial direction in front or behind the first teeth 20 such that it is not necessary to provide the circular sector-shaped region S.

Figure 6:
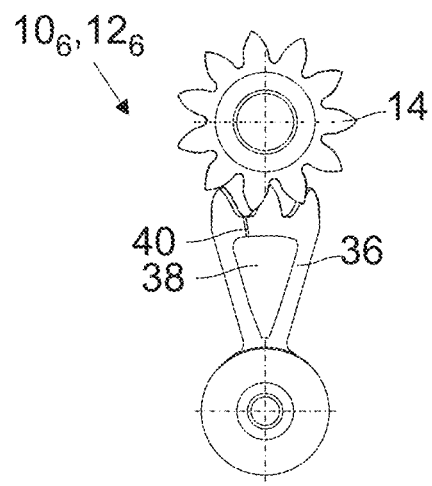

In FIG. 6 is depicted a sixth embodiment example of the gear pair $10_6$ based on a top view, which to a large extent resembles the gear pair $10_5$ according to the fifth embodiment example. For reasons of representation, only the common carrier 36 of toothed gear $12_6$ of the sixth embodiment example is therefore shown. Starting from the cavity or from the cutout 38, the common carrier 36 comprises a split 40 that can also be shaped as a cut. The common carrier 36 is hereby specifically and purposefully weakened such that it, and consequently also the second teeth 22, has an increased second deformability v2. In particular the central one of the second teeth 22 acquires hereby an increased radial mobility.

Figure 7A:
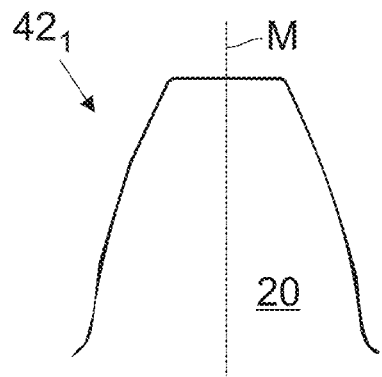
Figure 7B:
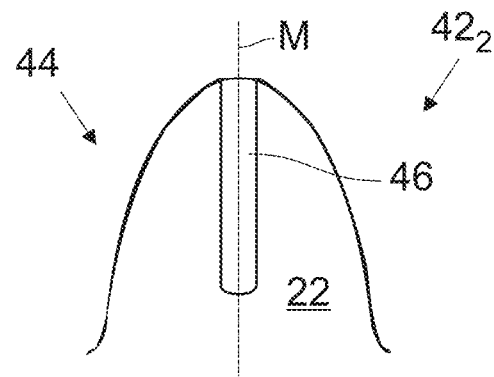

In FIGS. 7A and 7B a first tooth 20 with a first tooth profile $42_1$, and, respectively, a second tooth 22 with a second tooth profile $42_2$ are shown in conjunction with a fundamental view. The first tooth profile $42_1$, depicted in FIG. 7A, defines an involute toothing system. The second tooth profile $42_2$, based also on the involute toothing system depicted in FIG. 7A, however has a tip modification 44 such that it tapers outwardly and is more pointed than the first tooth profile $42_1$ shown in FIG. 7A. Alternatively or additionally, the second tooth 22 can have an increased tooth thickness in particular at least at one of the tooth flanks.

The second tooth 22 provided with the second tooth profile $42_2$, furthermore, comprises a radially outwardly extending groove or an also radially outwardly extending gap 46, which completely extends axially through the second tooth 22. The second deformability v2 can hereby be increased. The first tooth 20 as well as also the second tooth 22 extend symmetrically with reference to a center line M. In particular with reference to the FIGS. 1A, 4A and 4C, it becomes apparent that the second tooth profile $42_2$ with reference to the center line M, does not mandatorily need to be structured symmetrically in order to be able to attain the effect according to the disclosure.

Figure 8A:
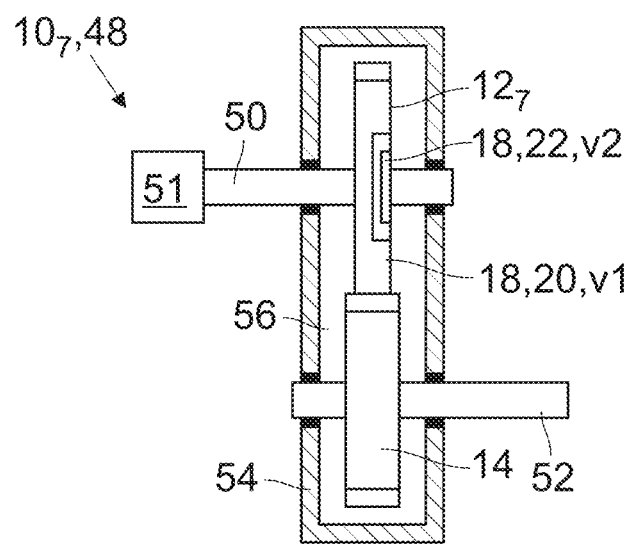

In FIG. 8A a gearing 48 is shown in conjunction with a fundamental sectional representation, which comprises a gear pair $10_7$ according to a seventh embodiment example. In the depicted gearing 48 the toothed gear $12_7$ is connected to a drive shaft 50, whereas the further toothed gear 14 is connected to an output shaft 52. The drive shaft 50 is connected with a torque source 51, for example with an electric motor.

Figure 8B:
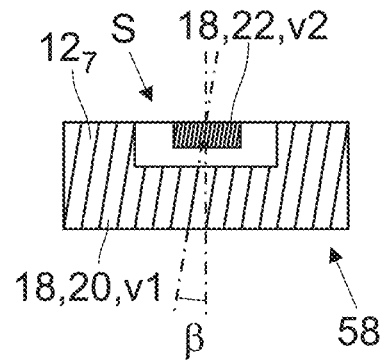

The drive shaft 50 and the output shaft 52 are supported in a housing 54 that encompasses a hollow volume 56 in which the toothed gear 12₇ and the further toothed gear 14 are disposed such that they are in mesh. The toothed gear 12₇ is herein fabricated of the cited technical thermoplastic or the high-performance thermoplastic, whereas the further toothed gear 14 is fabricated of a metal. The further toothed gear 14 can however also be fabricated of synthetic material. In FIG. 8B the toothed gear 12₇ according to the seventh embodiment example is shown in conjunction with a fundamental plan side view which is utilized in the gearing 48 depicted in FIG. 8A. In contrast to the previously introduced embodiments examples, the toothed gear 12₇ according to the seventh embodiment example has a helical toothing 58 with a helix angle β that is up to 15° and in particular between 1° and 19°. The further toothed gear 14 has a correspondingly shaped helical toothing (not shown).

The gearing 48 is operated in the following manner: in the resting position which, for reasons of representation, is now shown in FIG. 8A, the first teeth 20 as well as also the second teeth 22 of toothed gear 12₇ are in mesh with the further toothed gear 14. In the resting position the toothed gear 12₇ and the toothed gear 14 have each a starting temperature, for example ambient temperature, which, depending on the application, is at the lower edge of the operating temperature range of the gearing 48.

Due to the increased second deformability v2, the second teeth 22 can be equipped with an oversize compared to the first teeth 20, which can be expressed, for example, by an increased tooth thickness. The second teeth 22 ensure at a large operating temperature range, for example at temperatures near the lower end of the operating temperature range, a lower circumferential backlash, while the first teeth 20 at temperatures near the upper end of the operating temperature range keep the circumferential backlash low. During operation of the gearing 48, which is started in particular with the activation of the torque source 51, the toothed gear 12₁ and the further toothed gear 14 become heated. The heating of toothed gear 12₁ and of the second [sic: further] toothed gear 14, however, can also be brought about through external effects occurring during operation, for example when a thermal process using water vapor in the immediate surroundings of the gearing 48 is carried out. There are also applications in which the gearing 48 cools due to the effects occurring during operation, for example during refrigeration processes carried out in the immediate surrounding or when the gearing 48 is moved during operation into colder surroundings such as can be the case, for example, with passenger cars or airplanes.

However, in the following, the case is considered that the gearing 48 becomes heated during operation. As stated, the meshing of the first teeth 20 at the starting temperature, which conventionally is at the lower end of the operating temperature range, is not optimal. However, the meshing of the first teeth 20 improves with increasing temperature to reach its optimum, for example, at the upper end of the operating temperature range. Due to the increased second deformability v2 of the second teeth 22, the oversize of the second teeth 22 does not lead to the jamming of the toothed gears in mesh when the upper end of the operating temperature range is reached.

LIST OF REFERENCE SYMBOLS

10 Gear pair
10₁-10₆ First to sixth embodiment example of the gear pair
12 Toothed gear
12₁-12₆ First to sixth embodiment example of the toothed gear
14 Further toothed gear
16 Base body
18 Ring gear
20 First teeth
22 Second teeth
24 Hub section
26 Connection web
28 Connection section
30 Annular cavity
32 Fins
36 Common carrier
38 Cutout
40 Split
42 Tooth profile
42₁ First tooth profile
42₂ Second tooth profile
44 Tip modification
46 Gap
48 Gearing
50 Drive shaft
51 Torque source
52 Drive [sic: Output] shaft
54 Housing
56 Hollow volume
58 Helical toothing
AA Axial distance
AS Distance between two second teeth
AU Circumferential distance
B Width
B1 First width
B2 Second width
E Modulus of elasticity
E1 First modulus of elasticity
E2 Second modulus of elasticity
L Longitudinal axis
M Center line
S Circular sector-shaped region
v1 First deformability
v2 Second deformability
α1 First thermal coefficient of expansion
α2 Second thermal coefficient of expansion
β Helical angle

The invention claimed is:

1. A toothed gear for use in a gearing, comprising:
   a base body having a longitudinal axis and forming a ring gear, with the ring gear comprising:
   a plurality of first teeth having a first deformability,
   a plurality of second teeth having a second deformability,
   wherein the second deformability is greater than the first deformability,
   wherein the second teeth disposed on a circular sector-shaped common carrier that is disposed within a circular sector-shaped opening of the ring gear and having an oversize compared to the first teeth, and
   wherein the second teeth have the oversize only in a circumferential direction.

2. The toothed gear as in claim 1, wherein the ring gear in a region of the second teeth within the common carrier is free of interruptions in the circumferential direction.

3. The toothed gear as in claim 1, wherein the common carrier comprises a circular sector shaped cutout or a cavity along the longitudinal axis.

4. The toothed gear as in claim 3, wherein the common carrier comprises a cut, starting from the cutout or the cavity and extending radially outwardly, or a slit, starting from the cutout or the cavity and extending radially outwardly.

5. The toothed gear as in claim 4, wherein the common carrier has an axial distance in the direction of the longitudinal axis and/or a circumferential distance from the first teeth.

6. The toothed gear as in claim 1, wherein the second teeth have a tooth profile with a tooth tip modification.

7. The toothed gear as in claim 1, wherein the second teeth comprise a radially outwardly extending groove or a radially outwardly extending gap.

8. The toothed gear as in claim 1, wherein the second teeth toothed-gear is comprised of a technical thermoplastic or a high-performance thermoplastic, and wherein the toothed gear has a modulus of elasticity of 1000 to 3500 MPa.

9. The toothed gear as in claim 8, wherein the technical thermoplastic or the high-performance thermoplastic is self-reinforcing or fiber-reinforced, wherein the fiber component is up to 35%.

10. The toothed gear as in claim 8, wherein the first teeth toothed gear has a modulus of elasticity between 6000 and 13000 MPa where the technical thermoplastic or the high-performance thermoplastic is self-reinforcing or fiber-reinforced.

11. The toothed gear as in claim 1 wherein:
the first teeth are comprised of a first technical thermoplastic or a first high-performance thermoplastic, the second teeth are comprised of a second technical thermoplastic or a high-performance thermoplastic,
wherein the second technical thermoplastic or the second high-performance thermoplastic has a lower modulus of elasticity and/or a lower thermal coefficient of expansion than the first technical thermoplastic or the first high-performance thermoplastic.

12. The toothed gear as in claim 1, wherein one tooth of the second teeth has an oversize only in the counterclockwise circumferential direction and two of the second teeth have an oversize only in the clockwise circumferential direction.

13. The toothed gear as in claim 1, wherein the second teeth are asymmetric with each second tooth being oversized in the counterclockwise circumferential direction or oversized in the clockwise circumferential direction.

\* \* \* \* \*